June 10, 1941. A. LANGSNER 2,245,405
TELESCOPE
Original Filed Feb. 1, 1935
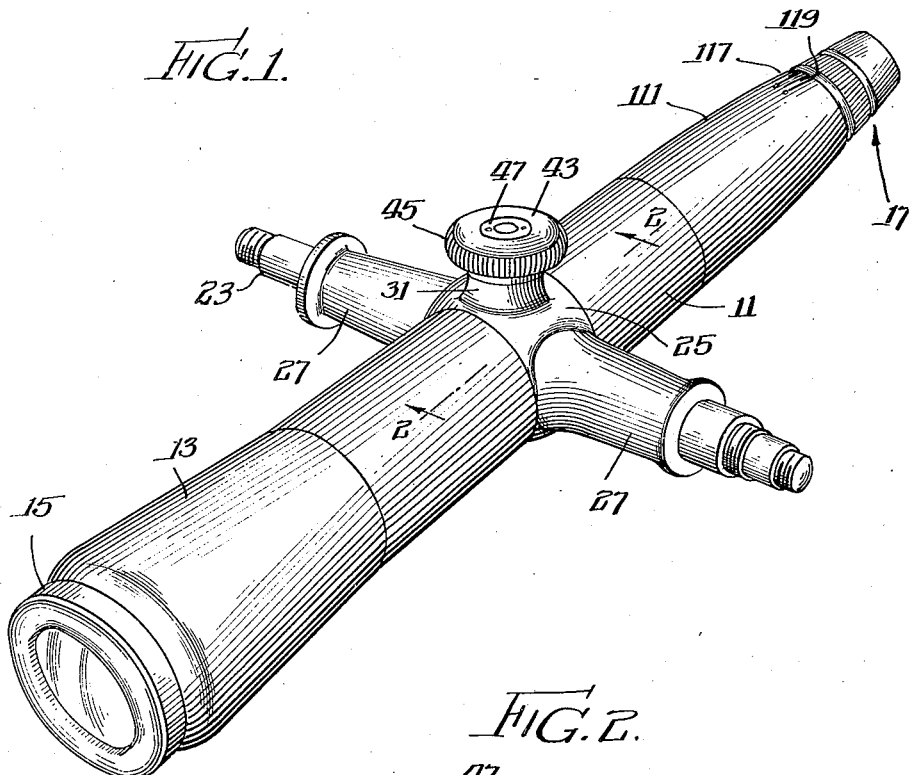
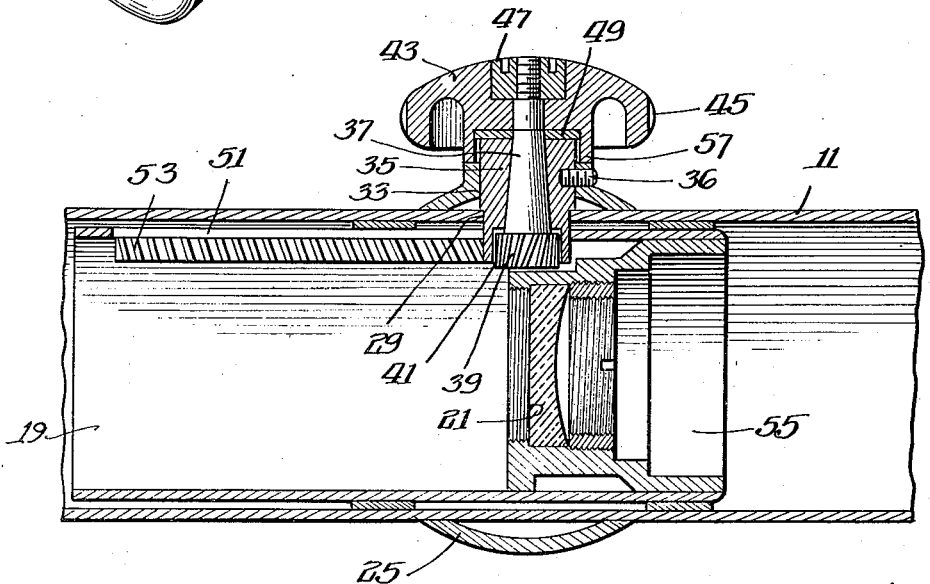
Inventor
Adolph Langsner
By: Cox & Moore
attys.

Patented June 10, 1941

2,245,405

UNITED STATES PATENT OFFICE 2,245,405

TELESCOPE

Adolph Langsner, Chicago, Ill., assignor to Eugene Dietzgen Co., Chicago, Ill., a corporation of Delaware Original application February 1, 1935, Serial No. 4,433. Divided and this application December 24, 1937, Serial No. 181,678

5 Claims. (Cl. 88—32)

My invention relates in general to telescopes and has more particular reference to telescopes for use in surveying instruments, such as levels, transits, and the like, the present application being divided from my application for United States Letters Patent for Telescope, Serial No. 4,433, filed February 1, 1935, issued as Patent No. 2,130,095, Sept. 13, 1938.

An important object is to provide improved dust-proof adjusting means for a telescope, the construction permitting adjustment from outside of the barrel of the telescope while preventing entrance of dust and other foreign matter.

An important object is to provide a support for a telescope, carrying telescope focusing means.

Another important object is to form a support element for a telescope on the barrel thereof and to utilize the support element as a mounting for a manually operable telescope adjusting knob, whereby the support element not only carries the telescope but also serves as a bearing for an operating part of the telescope.

Another object is to utilize a telescope supporting element, which is rigidly mounted or formed on the barrel of the instrument, as a dust-proof mounting for a manually operable telescope focusing knob, said mounting having the dual function of mounting the instrument in operative position and, in cooperation with the focusing knob, to exclude entrance of dust and foreign matter into the barrel of the instrument at the point of entrance therein of the adjusting mechanism.

Another object is to provide a telescope which is mounted for adjustable tilting movement with a manually adjustable knob for focusing the same in position, such that manipulation of the focusing knob may be accomplished with minimum tendency to disturb the tilted position of the telescope.

Another object is to provide a telescope having a mounting for supporting the telescope for tilting movement about an axis normal to the longitudinal axis of the telescope and a turnable focusing knob mounted on the telescope for turning movement about an axis substantially normal with respect to the longitudinal axis of the telescope as well as its axis of tilting movement, whereby said axes intersect at a common point and render the instrument more stable during focusing.

Another important object is to provide a transit of improved appearance and stability by arranging the focusing knob at the tilting axis of the transit telescope.

Numerous other objects and advantages of the invention will be apparent from the following description, which, taken in connection with the accompanying drawing, discloses a preferred embodiment of the invention.

Referring to the drawing:

Figure 1 is a perspective view of a telescope embodying my present invention; and Figure 2 is a section on line 2—2 in Figure 1.

To illustrate my invention, I have shown on the drawing a telescope 11, more especially adapted for use in a transit, although my present invention is, of course, not necessarily restricted to telescopes used in transits.

The telescope, as shown in the drawing, comprises a tubular barrel preferably of cylindrical configuration, which is or may be belled or enlarged at one end, as at 13, to receive an objective lens assembly 15. The telescope barrel, at the end opposite the objective lens assembly, is fitted with an eye piece assembly 17 and the barrel carries an objective slide 19 therein between the eye piece and lens assemblies 15 and 17. This objective slide 19 preferably carries a lens 21 and is movable longitudinally within the barrel for the purpose of focusing the telescope.

The barrel of the telescope is carried in a mounting or support 23 having an annular portion 25 snugly fitted to and embracing upon the outer surfaces of the barrel, said mounting including means for attaching the same on a support whereby the telescope may be carried in operating position; and I have shown the mounting formed with arms 27 extending outwardly thereof on opposite sides of the portion 25 whereby to form an axle for the purpose of tiltingly supporting the telescope, as in a transit. To this end the arms 27 are shown formed, at their extremities, for reception in the bearings usually provided in the frame of a transit in which the instrument may be mounted. Obviously, however, the arms may be formed in any preferred manner and, as an alternative construction, the mounting 23, for example, may be formed to provide for supporting the telescope in the frame of a level, in which case the portion 25 of the mounting may be secured on the barrel of the telescope at or near one end thereof instead of being located in the central position shown in the illustrated embodiment, and the arms may be arranged suitably for attachment in the frame of the level.

The barrel of the illustrated telescope is formed with a perforation 29 between the marginal confines of the annular portion 25, and the portion 25 carries an embossment 31 having a perforation 33 disposed in alignment with the opening 29 in the barrel of the telescope. The perforations 29 and 33 snugly receive a bushing 35 extending within the barrel of the telescope at one end and projecting outwardly of the boss 31 at the other. This bushing may be held in place in any suitable or preferred manner, as by means of the set screws 36, and it provides a tapered bearing, which enlarges toward its inner end and which is adapted to receive a shaft having a correspondingly tapered portion 37. The inner end of this shaft carries a pinion 39 disposed within a socket 41 formed at the inner end of the bushing 35, within the barrel of the telescope. The outer end of the shaft 37 projects outwardly of the outer end of the bushing 35 and is formed to receive a manually operable knob 43, the peripheral edges of which may be knurled or otherwise formed as at 45 to facilitate manipulation of the same. A nut 47, adapted to thread upon the shaft and seat in a socket formed in the knob 43 is provided for the purpose of holding the knob on the shaft. If desired, a washer 49 may be interposed between the knob 43 and the outer end of the bushing 35. The knob also serves to hold the tapered shaft 37 in its bearing.

The objective slide 19 is supported within the barrel of the telescope for free sliding movement longitudinally therein, the slide preferably comprising a tubular element of cross-sectional configuration conforming with that of the telescope barrel and having a longitudinal slot therein as at 51 for receiving the inwardly projecting end of the bushing 35. The tubular element forming the slide 19 also carries a rack 53 secured adjacent the slot 51 in position to match with the pinion 39, the bushing portions, forming the socket 41, being cut away on one side to permit driving relationship between the rack and pinion.

The tubular element also carries a mounting 55 for the lens 21 so that by manipulating the knob 43 outside of the telescope barrel, the slide 19 and hence the focusing lens 21 may be shifted within and longitudinally of said barrel. The knob 43 is or may be provided with depending skirt portions 57 extending in position to embrace the upper outer end of the bushing 35 and to seat snugly upon the boss 31 to minimize the possibility of the entrance of foreign matter to the outer end of the bushing between the knob and the embossment 31. The bushing 35, moreover, is tightly fitted into the opening 33 of the embossment and also into the opening 29 of the barrel so that it is practically impossible for any foreign matter, which may enter between the knob and the embossment, to penetrate between the bushing and the embossment. The annular portion 25 also is tightly secured on the barrel so that foreign matter may not enter between said annular member and the telescope; however, should foreign matter reach the opening 29, it will be substantially excluded from entering the barrel of the telescope since the bushing 35 snugly fits and seals the opening 29. Such foreign matter, as may enter between the edge of the skirt 57 and the embossment 31, will be excluded from the shaft portion 37 by the washer 49, which is snugly secured by and between the knob 43 and the end of the bushing.

The construction illustrated is well adapted to prevent entrance of foreign matter, such as dirt and moisture, into the barrel through the mechanism for the adjustment of the objective slide 19. By mounting said adjusting mechanism in the support 25, I utilize said support in order to assist in excluding access of foreign matter to the opening 29, so that the mounting 23 not only serves to support the telescope in operative position but has the additional function of carrying the adjusting means in a dust-proof manner.

By thus arranging the axis of the adjusting shaft 37 and knob 43 in the plane of the tilting axis of the telescope, which intersects the longitudinal axis of the telescope at right angles, I have reduced to a minimum the forces which act upon the telescope during manipulation of the focusing knob and which tend to disturb the tilted adjustment of the telescope on its axle 27.

It should be understood that a telescope of this character, when used in a surveying instrument, may be "levelled" or adjusted to a desired tilted position on the axle 27 by means of a spirit level (not shown) which is mounted or clipped onto the barrel. It is ordinarily necessary to adjust the focus of the instrument each time the instrument is sighted on a target. Since several targets may be sighted without releveling the instrument, it is desirable to minimize the possibility of disturbing the levelled condition of the instrument during focusing. This, in the present instance, is accomplished by positioning the focusing adjustment means at the tilting fulcrum of the telescope.

It is thought that the invention and numerous of its attendant advantages will be understood from the foregoing description, and it is obvious that numerous changes may be made in the form, construction and arrangement of the several parts of the illustrated apparatus without departing from the spirit or scope of my invention or sacrificing any of its attendant advantages, the preferred form herein described being merely for the purpose of illustrating the invention.

The invention is hereby claimed as follows:

1. A telescope comprising a barrel having an opening, an adjustable support for an optical element in the barrel, a collar tightly embracing the barrel and having an opening therein registering with the opening of the barrel, adjusting means for said support, comprising a turnable stem having a portion extending in said aligned openings and supported on and by said collar and having an outwardly extending end adapted for manipulation from outside of the barrel to adjust said support within the barrel, said collar being formed with an arm projecting outwardly of the telescope and forming an axle for mounting the telescope for tilting movement about the axis of the axle, said collar supporting said stem in position with its axis lying in the plane of and extending at right angles to the axis of said axle.

2. A telescope comprising a barrel having an opening, an adjustable support for an optical element in the barrel, a collar tightly embracing the barrel and having an opening therein registering with the opening of the barrel, adjusting means for said support, comprising a turnable stem having a portion extending in said aligned openings and supported on and by said collar and having an outwardly extending end adapted for manipulation from outside of the barrel to adjust said support within the barrel, said collar being formed with an arm projecting outwardly of the telescope and forming an axle for mounting the telescope for tilting movement about the axis of the axle, said collar supporting said stem in position with its axis lying in the plane of and extending at right angles to the axis of said axle, and also at right angles to the longitudinal axis of said barrel.

3. A telescope comprising a barrel having an opening, an adjustable support for an optical element in the barrel, a collar tightly embracing the barrel and having an opening therein registering with the opening of the barrel, adjusting means for said support, comprising a turnable stem having a portion extending in said aligned openings and supported on and by said collar and having an outwardly extending end adapted for manipulation from outside of the barrel to adjust said support within the barrel, said collar being formed with projections in alignment on opposite sides of the telescope and forming axle means for mounting the telescope for turning movement about the axis of the axle in the plane of and at right angles to the axis of the stem.

4. A telescope comprising a tubular barrel carrying lens means and having an adjustable focusing element therein, a mounting comprising a collar embracing said barrel intermediate its ends, said barrel and collar having aligned openings forming a channel therethrough and said collar tightly embracing the barrel to prevent entrance of foreign matter therebetween to said channel, a boss on said collar at an end of said channel, means forming a bushing in said channel, said boss forming an annular shoulder at and surrounding the outer end of said bushing, a shaft rotatable in said bushing and drivingly connected with said adjustable element, said shaft having an end extending outwardly of said boss, and manually operable means on said end of the shaft for turning the same, said manually operable means having a dependent annular portion sealingly engaging said annular shoulder and serving to seal the outer end of said boss and bushing whereby to prevent entrance of foreign matter into said barrel between the collar and bushing and between the bushing and said shaft.

5. A telescope comprising a tubular barrel carrying lens means and having an adjustable focusing element therein, a mounting comprising a collar embracing said barrel intermediate its ends, said collar having intermediate portions forming with said barrel an annular chamber, and spaced annular portions snugly engaging said barrel on opposite sides of said chamber to prevent entrance of foreign matter into said chamber between the barrel and said annular portions of the collar, said barrel having an opening into said annular chamber, and said collar having an opening aligned with the opening of said barrel, a boss on said collar at the opening in the collar, sleeve-like means forming a bushing snugly fitting in the openings in the collar and barrel, said bushing having a shoulder engaging said barrel around the opening therein and an outer end extending in said boss, said boss forming an annular shoulder at and surrounding the outer end of said bushing, a shaft rotatable in said bushing and drivingly connected with said adjustable element, said shaft having an end extending outwardly of said boss, and manually operable means on said end of the shaft for turning the same, said manually operable means having an annular portion sealingly engaging said annular shoulder and serving to seal the outer end of said boss and bushing to prevent entrance of foreign matter along said shaft into said barrel and between the collar and bushing into said annular chamber.

ADOLPH LANGSNER.